Nov. 9, 1948.  H. A. ALEXANDERSON  2,453,652
THROTTLE CONTROL FOR AIRCRAFT ENGINES
Original Filed Nov. 2, 1943  7 Sheets-Sheet 1

Fig. 1.

INVENTOR
Howard A. Alexanderson.
BY Herbert L. Davis, Jr. ATTORNEY

Nov. 9, 1948.   H. A. ALEXANDERSON   2,453,652
THROTTLE CONTROL FOR AIRCRAFT ENGINES
Original Filed Nov. 2, 1943                              7 Sheets-Sheet 2

INVENTOR
Howard A. Alexanderson
BY
Herbert L. Davis, Jr.
ATTORNEY

Nov. 9, 1948.   H. A. ALEXANDERSON   2,453,652
THROTTLE CONTROL FOR AIRCRAFT ENGINES
Original Filed Nov. 2, 1943   7 Sheets-Sheet 3

*Fig. 4.*

INVENTOR
BY *Howard A. Alexanderson.*
BY *Herbert L. Davis, Jr.* ATTORNEY

Nov. 9, 1948.   H. A. ALEXANDERSON   2,453,652
THROTTLE CONTROL FOR AIRCRAFT ENGINES
Original Filed Nov. 2, 1943   7 Sheets-Sheet 4

Nov. 9, 1948. H. A. ALEXANDERSON 2,453,652
THROTTLE CONTROL FOR AIRCRAFT ENGINES
Original Filed Nov. 2, 1943 7 Sheets-Sheet 5

Fig. 6.

INVENTOR.
Howard A. Alexanderson
BY
Herbert L. Davis, Jr.
Attorney

Fig. 7.

Patented Nov. 9, 1948

2,453,652

UNITED STATES PATENT OFFICE 2,453,652

THROTTLE CONTROL FOR AIRCRAFT ENGINES

Howard A. Alexanderson, Wood-Ridge, N. J., assignor to Bendix Aviation Corporation, Teterboro, N. J., a corporation of Delaware Continuation of application Serial No. 508,724, November 2, 1943. This application October 31, 1947, Serial No. 783,237

38 Claims. (Cl. 123—103)

The present application is a continuation of my application Serial No. 508,724, filed November 2, 1943, and now abandoned.

My present invention relates to improved control devices and systems of the class disclosed by Patent No. 2,088,954, granted to David Gregg under date of August 3, 1937, and Patent No. 1,978,863, granted to David Gregg and Wesley L. Smith under date of October 30, 1934, both of which patents are owned by the assignee of the present invention.

More specifically, the present invention relates to a novel and improved control mechanism for regulating automatically the intake manifold pressure of an internal combustion aircraft engine in accordance with predetermined intake manifold pressure values determined by an adjustable control member.

An object of my invention is to provide novel means responsive to the intake manifold pressure for adjusting a carburetor throttle so as to approximate predetermined pressure values and novel manually adjustable means for selecting such pressure values.

Another object of my invention is to provide a novel adjustment means for directly actuating an automatic carburetor throttle control in a first sense, and a second novel intake manifold pressure responsive means for directly actuating the throttle control in an opposite sense, and the first and second means acting upon the throttle control through a novel floating lever arrangement.

Another object of my invention is to provide novel safety means for preventing the automatic carburetor throttle control from opening the throttle past a predetermined maximum open throttle position so that further opening of the throttle past such position may be affected only through adjustment of the manual control. Thus there may be avoided possible damage to the control mechanism and confusion to the pilot through the operation of the automatic throttle control under conditions which would otherwise cause the automatic control to call for further opening of the throttle past its maximum open position. Further, such safety feature provides means whereby the opening of the throttle past the predetermined open position may be placed directly under the control of the pilot and thus provide for more positive control of the engine at such extreme position of the throttle.

Another object of my invention is to provide a further novel safety means for effecting a lock out of the automatic control means so as to prevent the automatic opening of the throttle upon the manual control being adjusted to a predetermined minimum pressure selecting position so that further closing of the throttle may be affected through adjustment of the manual control. Thus I have provided safety means for affecting a positive manual control for closing the throttle to the extreme or fully closed position, and means for fully closing the throttle regardless of the pressure within the intake manifold or the condition of the pressure responsive control mechanism which might otherwise cause the automatic control means to prevent the full closure of the throttle.

A further object of my invention is to provide novel means for regulating the intake manifold pressure so as to compensate for changes therein due to variations in atmospheric pressure or other conditions affecting such pressure.

Another object of my invention is to provide in combination with a first control lever for an automatic throttle control, a second lever for directly controlling the throttle so that any adjustment made by such automatic throttle control in response to the first control lever will be subject at all times to the adjustment of said second lever.

Another object of my invention is to provide novel means whereby the throttle may at all times be subject to manual control while retaining the automatic features noted.

A further object of my invention is to provide novel manually adjustable means for varying the limits of the automatic control of the throttle.

It is also an object of my invention to provide novel control means whereby the throttle may be conveniently adjusted from the cabin of a plane for conditions affecting the engine due to variables not reflected merely in the intake manifold pressure so that the aforenoted automatic adjustment of the throttle may be subject at all times to the discretion of the pilot.

Other objects and advantages of this invention are set forth in the following description, taken with the accompanying drawings; and the novel features thereof are pointed out in the appended claims. The disclosure, however, is illustrative only and changes may be made in detail, especially in matters of shape, size and arrangement of parts within the principle of the invention, to the full extent indicated by the meanings of the terms in which the appended claims are expressed.

In the drawings:

Figure 8 is a diagrammatic sketch of a modified form of my invention.

Figure 4:
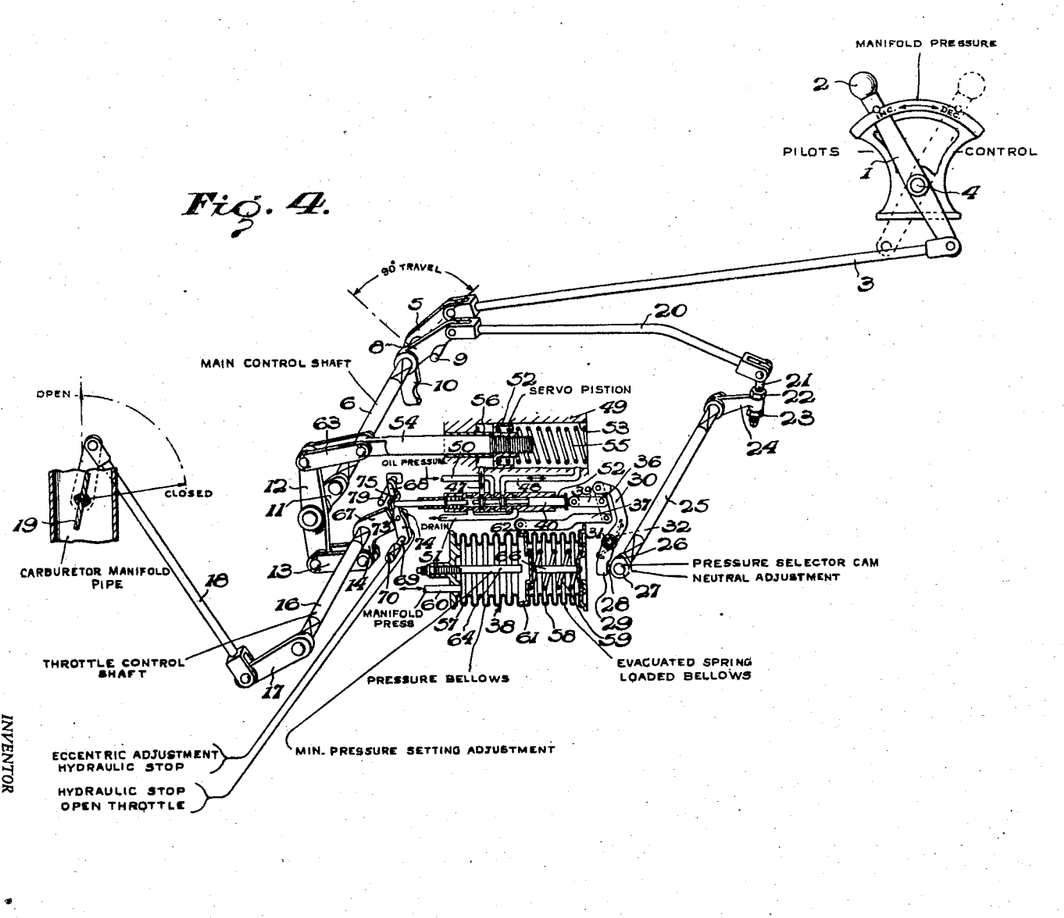
Figure 4 is a diagrammatic view of my control device illustrating the mode of operation.

The form of my invention illustrated diagrammatically in Figure 4 is preferably operated by a main control lever 1 which may be conveniently mounted within the cabin of a plane for operation by the pilot. As shown by full lines in Figure 4, the main control lever 1 has been adjusted to a relative pressure increase position, while the same is shown in dotted lines in a relative pressure decrease position. At one end of the main control lever 1 is provided an operative knob 2. At the opposite end of the main control lever 1 there is pivotally connected a main control rod 3. The main control lever 1 may be pivotally mounted within the cockpit of the plane at a point 4 positioned intermediate the opposite ends of the control lever 1.

Figure 5:
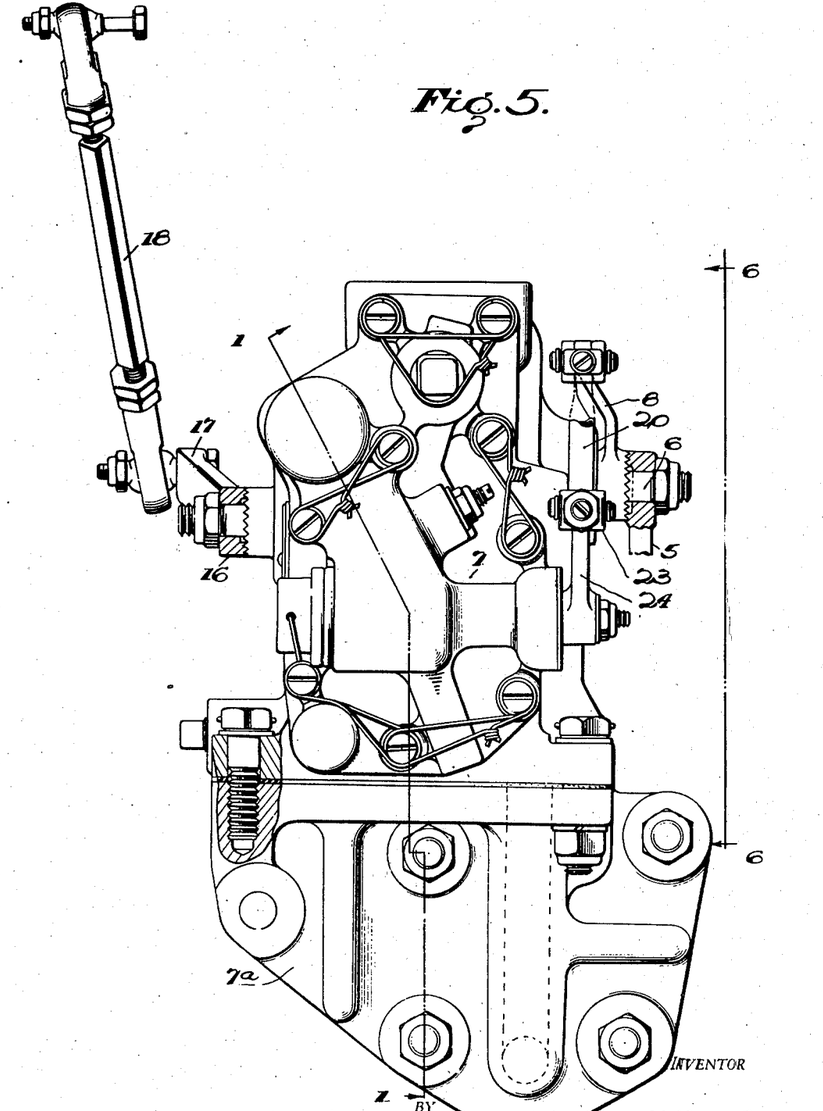
Figure 5 is an enlarged end view of my control device.

As shown in Figures 4 and 5, there is pivotally connected at the opposite end of the main control rod 3, an arm 5 mounted on a main control shaft 6 and positioned exteriorly of a casing 7. The casing 7 houses my novel control mechanism and may be conveniently mounted on a bracket 7A as shown in Figure 5.

Figure 2:
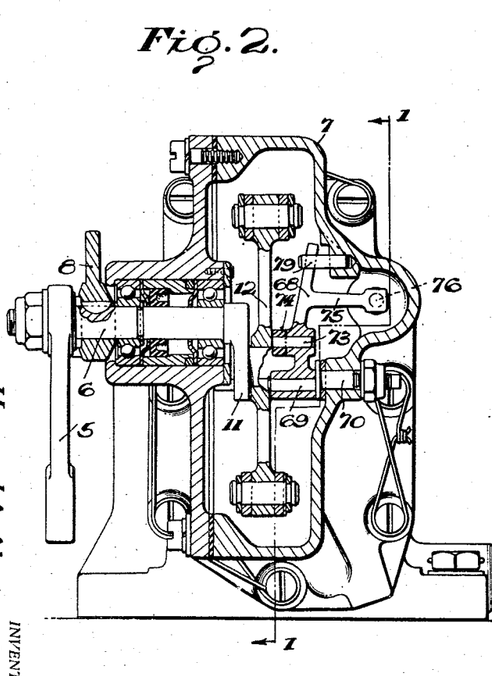
Figure 2 is a sectional view of Figure 1 taken along the lines 2—2 with the parts in the dotted line position and with certain of the parts broken away so as to better illustrate the structure of the valve stop actuating arm.

As shown in Figures 2 and 5, there is formed integral with the arm 5, a second arm 8 likewise mounted on the main control shaft 6 and positioned exteriorly of the casing 7. Movement of the arm 8 may be limited as indicated in Figure 4 by a stop 9, which is arranged for engagement by the arm 8 and a second engaging arm 10 formed integral with the arm 8.

The main control shaft 6 extends into the casing 7 and is rotatably mounted on anti-frictional roller bearings, as shown in Figure 2.

Figure 1:
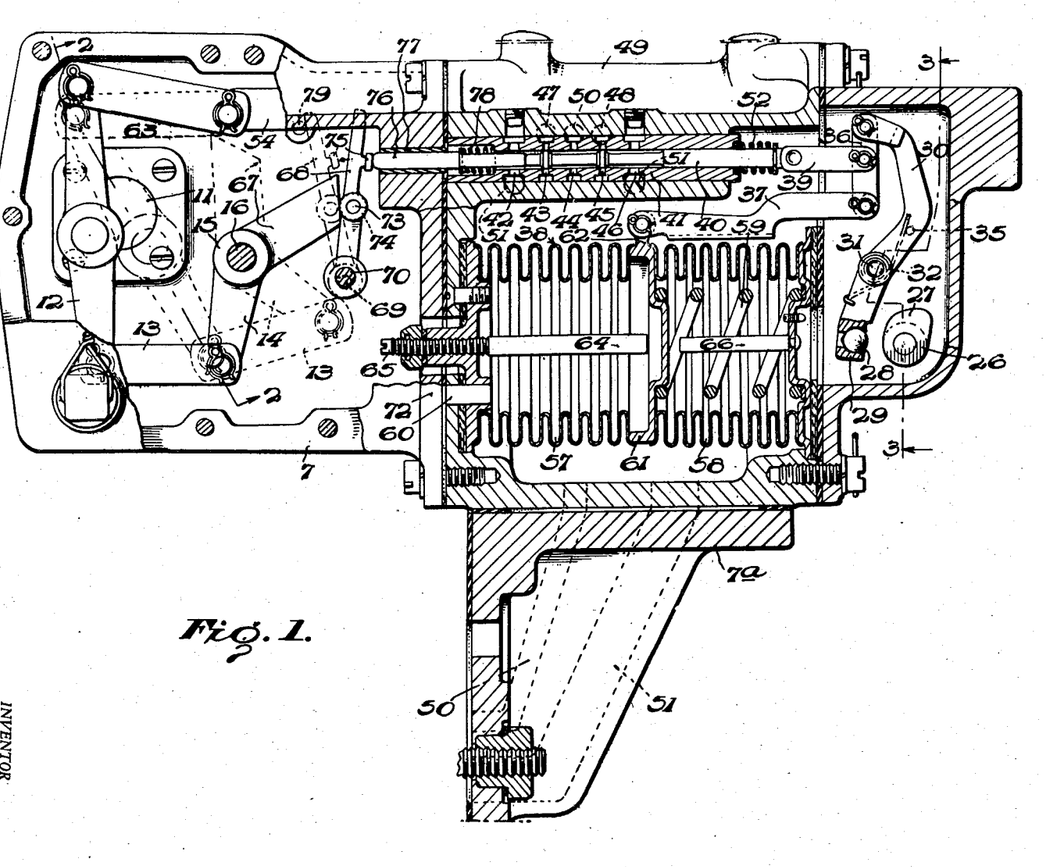
Figure 1 is a sectional side view of my control device taken along the lines 1—1 of Figures 2 and 5 with certain parts broken away for clarity and illustrating in full lines the operation of my novel safety means upon the throttle being adjusted to a full open position and showing in dotted lines the relative position of the parts upon the main pressure control being adjusted so as to decrease the relative pressure at the intake manifold.

Positioned within the casing 7 and fixedly mounted at the inner end of the main control shaft 6 is a crank pin 11. The crank pin 11 has pivotally mounted at the free end thereof a walking beam 12. The walking beam 12 is pivotally connected at one end to a link 13 which is in turn pivotally connected at the other end to an arm 14 of a bell crank lever 15, as shown in Figure 1. The bell crank lever 15 is mounted on a shaft 16.

The shaft 16 is mounted on anti-frictional roller bearings and projects through the casing 7, as shown in Figure 5. Mounted at the outer end of the shaft 16 is an arm 17 having pivotally connected at the free end a throttle control rod 18 for adjustably positioning a throttle valve 19 positioned within the intake manifold of the carburetor on a conventional aircraft internal combustion engine, as indicated diagrammatically in Figure 4. The throttle valve 19 is located at the inlet of the engine's intake manifold for the control of the intake manifold pressure.

Figure 3:
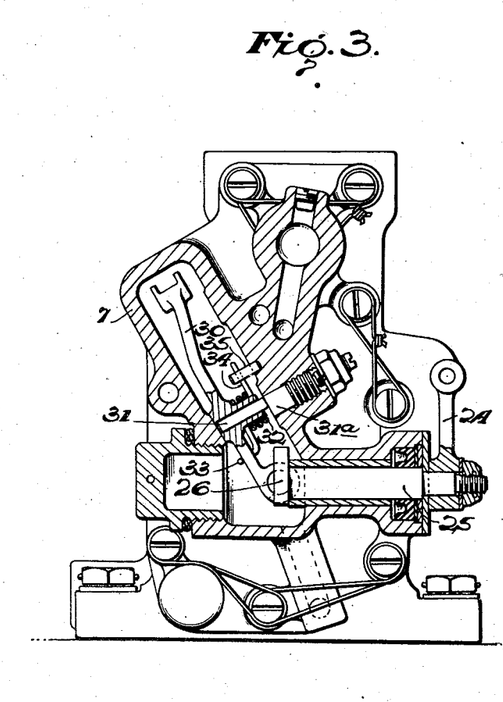
Figure 3 is a sectional view of Figure 1 taken along the lines 3—3 and looking in the direction of the arrows.

Pivotally connected to the arm 8 previously described, is one end of a linkage rod 20. The opposite end of the rod 20 is pivotally connected to one end of a screw threaded bolt 21 which is fastened by adjustment nuts 22 and 23 to one end of a lever arm 24 mounted on a pressure selector cam shaft 25, as shown in Figures 3, 4 and 5. It will be readily seen that by adjusting the nuts 22 and 23, the effective length of the bolt 21 may be varied and accordingly the effective length of the lever arm 24 so as to provide a convenient means for adjusting the operative range of the pressure selector cam shaft 25. The cam shaft 25 projects into the casing 7 and is preferably mounted in an anti-frictional bearing, as shown in Figure 3.

The cam shaft 25 has fixedly mounted at the inner end thereof, a cam 26 which may be adjustably positioned by the adjustment of the shaft 25. The cam 26 has provided a variable cam surface 27 which is arranged to bear upon an anti-frictional single ball bearing 28 carried within a socket 29 formed within one end of a lever 30. As shown in Figure 3, the lever 30 is pivotally mounted within the casing 7 at a point intermediate the opposite ends thereof on an eccentric pin 31 which may be adjustably positioned for calibration purposes by an adjustment screw 31A.

Carried by the lever 30, as shown in Figures 1, 3 and 4, is a torsion spring 32 engaging at one end 33, the lever 30 and at an opposite end 34 a pin 35 mounted within the casing 7 in such a manner that the torsion spring 32 exerts a biasing force upon the lever 30 tending to force the same in a counter-clockwise direction, as viewed in Figures 1 and 4. The effect of the biasing force of the spring 32, therefore, normally causes the anti-frictional ball bearing 28 to ride upon the cam surface 27 of the cam 26.

The lever 30 is pivotally connected at the opposite end from the ball bearings 28 to one end of a floating lever 36. The opposite end of the floating lever 36 is pivotally connected to one end of a linkage arm 37. The linkage arm 37 is operatively connected at the opposite end to a pressure responsive mechanism indicated generally by the numeral 38 and which will be described hereinafter.

A third link 39 is pivotally connected at one end to the floating lever 36 at a point intermediate the opposite ends of the lever 36. The opposite end of the link 39 is affixed to a slidably adjustable member 40 for controlling a servo-valve of conventional type. The member 40 is slidably mounted within a valve sleeve 41, positioned within the wall of the casing 7. Carried by the servo-valve control 40 is a tension spring 52 which exerts a force biasing the link 39 toward the floating lever 36. The valve sleeve 41 has provided ports 42, 43, 44, 45 and 46, as shown in Figures 1 and 4. The ports 43 and 45 are connected by suitable conduits 47 and 48, respectively, to a servo-motor indicated generally by the numeral 49, while a conduit 50 is connected to the port 44 and serves as an inlet to the servo-valve of a suitable fluid medium under pressure such as oil under engine pressure for operation of the servo-motor 49. A drain conduit 51 is further connected to the ports 42 and 46 and serves as an outlet for the fluid pressure medium supplied to the servo-valve in the conventional manner.

Figure 6:
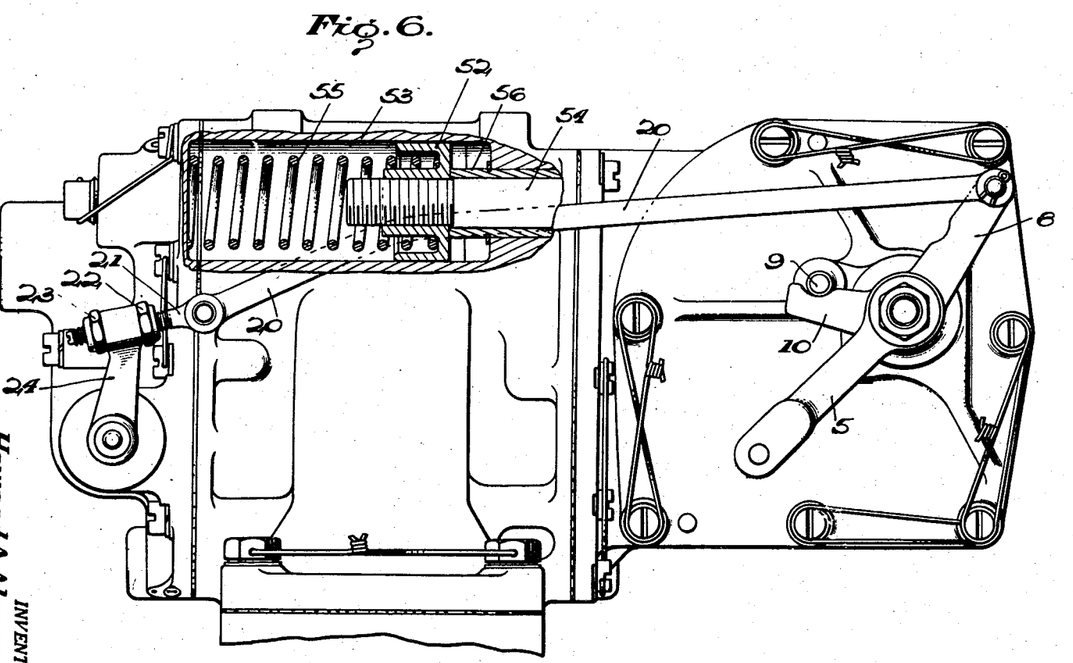
Figure 6 is a side view of Figure 5 looking in the direction of the arrows 6—6.

As shown in Figures 4 and 6 a servo-piston 52 is slidably mounted within a cylinder wall 53 of the servo-motor 49. The piston 52 is connected to the piston rod 54 in any conventional manner. A tension spring 55 biases the piston 52 in a direction tending to slide the rod 54 outwardly from the cylinder 53 for a purpose which will be explained hereinafter. Movement of the piston 52 in response to the biasing force of the spring 55 is limited by a collar 56 against which the piston 52 abuts in the extreme biased position.

The conduits 47 and 48, previously described, lead to opposite sides of the piston 52 so that adjustment of the servo-valve control 40 to the left of the neutral position shown in Figure 4 will cause the pipe 47 to serve as an inlet of pressure to the servo-motor 49 and thereby exert a biasing force upon the piston 52 to the right. Likewise, adjustment of the servo-valve control 40 to the right of the neutral position shown in Figure 4, will cause the pipe 48 to serve as an inlet of pressure to the servo motor 49 and exert biasing force upon the piston 52 to the left. Thus it will be seen that in the conventional manner the direction of movement of the piston rod 54 may be controlled by the adjustment of the servo-valve control 40.

While I have shown in the present embodiment of my invention a hydraulic control and power means, it will be readily apparent that other forms of controls and power means such as well known mechanical and electronic controls and power means, may be readily substituted therefor.

It will be further noted that the outer end of the piston rod 54 under control of the power means aforesaid, is pivotally connected by a link 63 to the opposite end of the walking beam 12 from that to which the link 13 is connected, as previously described. It will thus be seen that the adjustment of the walking beam 12, and accordingly the throttle control shaft 16 is dependent upon the affect thereon of the adjustment of the main control shaft 6 and the servo-motor 49.

The adjustment of the servo-motor 49 is dependent upon three novel features of my invention, which are, first, the adjustment of the pressure selector cam 26, previously described, second the position of the pressure responsive mechanism 38, as will be further described, in relation to the adjustment of the pressure selector cam 26, and third, by means to override the pressure responsive mechanism 38 and effective upon the adjustment of the main control shaft 6 irrespective of the position of the pressure selector cam 26 or the pressure responsive mechanism 38.

The pressure responsive mechanism 38, previously noted, comprises preferably a pair of bellows 57 and 58 mounted within the casing 7, as best shown in Figure 1. The bellows 58 is preferably partially evacuated and balanced by a coil spring 59 mounted within the bellows 58 so as to act against the biasing force of the intake manifold pressure in bellows 57. A wall 72 divides the inner portions of the casing 7 and has mounted thereon the bellows 57 which is connected through a conduit 60 passing through the wall 72 to the intake manifold pressure of an internal combustion aircraft engine in such a manner that the biasing force of the bellows 57 will vary in response to the intake manifold pressure. A plate 61 is mounted between the bellows 57 and 58 and is movable upon variance in the pressure exerted within the bellows 57, as is well known in the art. The plate 61 has provided a projecting arm 62 to which there is pivotally connected an end of the linkage arm 37 previously described.

From the foregoing it will be seen that the adjustment of the servo-valve control 40 will be dependent upon the intake manifold pressure acting upon the pressure responsive mechanism 38 and the corresponding adjustment thereof in relation to the adjustment of the cam 26. It should be pointed out here that the tension exerted by the spring 32 acting upon the arm 30 has a considerably greater biasing force upon the servo-valve control member 40 than the force exerted thereon by the relatively light tension exerted by the spring 52 mounted on the member 40, but the biasing forces exerted by the spring elements 32 and 52 have a substantially negligible effect upon the pressure responsive mechanism 38 due to the biasing force exerted by the much stronger spring 59 positioned within the bellows 58 for balancing the biasing force of the pressure within the bellows 57.

Thus it will be seen that in normal operation a decrease in the intake manifold pressure due for example to a rise in altitude, decrease in atmospheric pressure or other cause, would affect the bellows 57 and 58 so as to cause the relative contraction of the bellows 57 and the relative expansion of the bellows 58. Such action would cause the movement of the plate 61 and the longitudinal movement of the linkage arm 37 toward the left, as viewed in Figure 1. In normal operation, the spring 32 holds the ball 28 against cam 26 with arm 68 clear of pin 76 as is hereinafter explained.

Since, as previously explained, the spring 32 exerts a greater biasing force than the spring 52, it will be readily seen that such longitudinal movement of the arm 37 would cause the floating lever 36 to pivot in a clockwise direction on its pivotal connection to the arm 30, resulting in a corresponding longitudinal movement of the link 39 and servo-valve control member 40 to the left.

Thus with valve control member 40 first in the neutral position, such adjustment of the servo-value control member 40 would cause the opening of the port 43 to the inlet of the pressure medium provided through the port 44, resulting in the shifting of the piston 52 to the right as viewed in Figure 4 and the mechanical adjustment of the throttle 19 to a relatively increased open position through the action of the piston rod 54 on the link 63, walking beam 12, link 13, bell crank lever 15, throttle control shaft 16, arm 17 and rod 18, and thereby increasing the pressure exerted at the intake manifold.

Conversely, an increase in the intake manifold pressure would cause the relative expansion of the bellows 57 and contraction of the bellows 58, resulting in the longitudinal movement of the linkage arm 37 to the right.

Obviously, since the counter-clockwise movement of the arm 30 would be prevented by the cam 26, the latter adjustment of the linkage arm 37 would cause the counter-clockwise movement of the floating lever 36 about its pivotal connection to the lever 30, causing a corresponding longitudinal movement of the servo-valve control member 40 to the right. Thus with the valve control member first in the neutral position, such adjustment of the servo-valve control member 40 would cause the opening of the port 45 to the inlet of the pressure medium provided through the port 44, causing a shifting of the piston 52 to the left and the mechanical adjustment of the throttle 19 to a relative decreased open position and thereby decreasing the pressure exerted at the intake manifold.

Thus it will be seen that I have provided automatic means for compensating for either an increase or decrease in the pressure at the intake manifold, so that a predetermined standard pressure condition may be approximated. Obviously, upon standard pressure conditions being approximated, the pressure responsive mechanism 38 will cause the adjustment of the servo-valve control member 40 to a neutral position.

It will be further seen that I have provided novel adjustment means whereby the value of the predetermined standard pressure condition may be varied. Thus upon movement of the control lever 1, as shown in Figure 4, in a counter-clockwise direction, a clockwise movement of the main control shaft 6 will result, causing a corresponding clockwise movement of the walking beam 12 about its pivotal connection to the link 63 and causing in turn the clockwise movement of the throttle control shaft 16 so as to move te throttle 19 to a relative increased open position.

Furthermore, it will be seen that such adjustment of the control arm 1 will also cause the clockwise movement of the arm 8 and a corresponding clockwise rotation of the cam 26, as viewed in Figures 1 and 4.

The cam surface 27 is so arranged in relation to the arm 30 that as the cam is rotated in a clockwise direction, the arm 30 following the cam surface 27 under tension of the spring 32 pivots about the pin 31 in a counter-clockwise direction.

Further, with the bellows 57 and 58 in a balanced relation and the servo-valve control member in a neutral position, it will be seen that since the spring 32 exerts a greater biasing force than the spring 52 that the latter counter-clockwise movement of the arm 30 will cause the pivoting of the floating lever 36 in a similar counter-clockwise direction about its pivotal connection on the arm 37 and cause in turn a longitudinal movement of the link 39 and servo-valve control member 40 to the left as viewed in Figures 1 and 4.

Such movement of the servo valve control member 40, as previously described, will then cause an adjustment of the throttle 19 to a relative increased open position until the increased pressure resulting in the intake manifold causes the bellows 57 to expand effecting a longitudinal movement of the arm 37 to the right and the readjustment of the servo valve control member 40 to a neutral position. It will be thus seen that such adjustment of the control arm 1 will cause an increase in the value of the predetermined standard intake manifold pressure.

Conversely an adjustment of the manual control lever 1 in an opposite or clockwise direction would cause a decrease in the value of the predetermined standard intake manifold pressure.

Thus as the manual control lever 1 is adjusted in a decrease manifold pressure direction the value of the predetermined standard intake pressure is decreased, while as the control 1 is adjusted in the opposite direction this predetermined standard value is increased.

In my present invention I have provided several novel safety features including a novel lock out of the automatic adjustment means whereby upon adjustment of the main control lever 1 to a predetermined minimum standard pressure selecting position, the opening of the throttle 19 may be affected only by the manual adjustment of the control lever 1 without regard to the pressure existing at the intake manifold or the condition of the pressure responsive mechanism. This is specifically accomplished by providing an adjustable abutment rod 64 best shown in Figures 1 and 4.

The latter feature is claimed generically in my copending application Serial No. 550,646, filed August 22, 1944, as a division of application Serial No. 417,855, filed November 4, 1941, and now U. S. Patent No. 2,358,845, granted September 26, 1944, and assigned to Bendix Aviation Corporation.

The abutment rod 64 is screw-threaded engaged in the wall 72 and projects through the wall 72 into the bellows 57. A suitable cleft 65 is provided in the abutment rod 64 and is positioned exteriorly of the bellows 57 so that the abutment rod 64 may be conveniently adjusted longitudinally for calibration purposes. The abutment rod 64 is arranged so as to engage the plate 61 upon the pressure in the intake manifold decreasing to a predetermined low value equal to the critical standard value at which the automatic control for opening the throttle is to be discontinued and manual control alone remains.

Thus upon the manual control arm 1 being adjusted to the critical point for selection of the critical standard pressure value at and below which the automatic control for opening the throttle is to be discontinued, it will be apparent that if the actual pressure in the intake manifold be greater than the predetermined standard, the effect on the bellows 57 would be to cause the valve control member 40 to be adjusted so as to effect further closing of the throttle 19. However, if the intake manifold pressure be below the critical standard value, the bellows 57 would be prevented by the abutment rod 64 from contracting further so as to otherwise cause a further automatic opening of the throttle 19. Rather under the latter conditions, the opening of the throttle 19 may be accomplished only by positive manual adjustment of the control lever 1 toward the pressure increase position, while further closing of the throttle 19 may be accomplished by positive manual adjustment of the control lever 1 toward the pressure decrease position. Thus I have provided a safety means for causing the full closure of the throttle 19 regardless of the conditions acting upon the pressure responsive mechanism 38, which device, however, does not prevent the automatic closing of the throttle in the event of a pressure existing within the intake manifold greater than the value of the adjusted standard pressure value.

A second abutment rod 66 is also mounted within the bellows 58 as shown in Figure 1 for the purpose of limiting the excessive expansion of bellows 57 and contraction of bellows 58 which might otherwise cause mechanical damage thereto.

I have further provided a third safety means for preventing the automatic opening of the throttle 19 past a predetermined maximum critical point, and the said safety means so arranged that such opening of the throttle past such point may only be accomplished under the positive manual control of the lever 1.

The latter feature is claimed generically in the copending application Serial No. 440,669, filed April 2, 1942, by Frank C. Mock and assigned to Bendix Aviation Corporation.

In the present invention the foregoing is specifically accomplished by providing the bell crank lever 14 previously described with a knocker arm 67 arranged for actuating an arm 68. The arm 68 as shown in Figure 2, is pivotally mounted at one end on an eccentric pin 69 carried by an adjustment screw 70. The adjustment screw 70 is screw-threadedly engaged in the wall of the casing 7. The position of the arm 68 in relation to the knocker arm 67 may be conveniently adjusted for calibration purposes by means of the screw 70 which extends through the wall of the casing 7 to the exterior as shown in Figure 2.

Carried by the arm 68 is a pin 73 on which is mounted a roller 74 arranged for engagement by the knocker arm 67 as shown in Figure 1. There further projects from the arm 68, a second arm 75 which is arranged for engagement by a valve actuating stop pin 76 which is slidably mounted within a sleeve member 77 mounted within the wall 72. The pin 76 projects through the sleeve 77 into the valve sleeve 41 where it is adapted to engage in its inward position, the free end of the servo-valve control rod 40. The pin 76 is normally biased by a spring 78 into a disengaging relation from the rod 40 as shown in Figure 4. In the latter position the pin 76 under the biasing force of the spring 78 actuates the arm 68 in a counter-clockwise direction against a stop pin 79 mounted in the wall 7. Upon the throttle 19 being opened to a predetermined point the bell crank lever 15 will be positioned so as to cause the knocker arm 67 to engage the roller 74 mounted on the arm 68. Continued clockwise adjustment of the bell crank lever 15 will cause arm 68 to actuate the pin 76 inward, as shown in Figure 1, so as to prevent valve control rod 40 from being adjusted through the floating lever 36 to a position to the left of the neutral position. In the latter locked position a decrease in pressure at the intake manifold would cause merely a contraction of the bellows 57 and the actuation of the floating lever 36 so as to cause the clockwise movement of the lever 30 against the biasing force of the spring 32 so as to disengage the cam 26 as shown in Figure 1.

An increase in pressure above the predetermined standard value set through the adjustment of the cam 26 would of course cause the adjustment of the valve control rod 40 to the right of the neutral position shown in Figure 1 effecting a corresponding decrease in the setting of the throttle 19. From the position shown in Figure 1 an increase in pressure would cause the adjustment first through the floating lever 36 of the arm 30 in a counter-clockwise direction into engagement with the cam 26 and upon continued increase in pressure an adjustment of the valve control rod 40 to the right so as to effect a decrease in the setting of the throttle 19. A decrease in the intake manifold pressure could not in any event under the setting shown in Figure 1, cause an increase in the setting of the throttle 19.

Thus it will be seen that I have provided means whereby the opening of the throttle 19 past a predetermined critical point can be accomplished only through the adjustment of the manual control 1.

Figure 7:
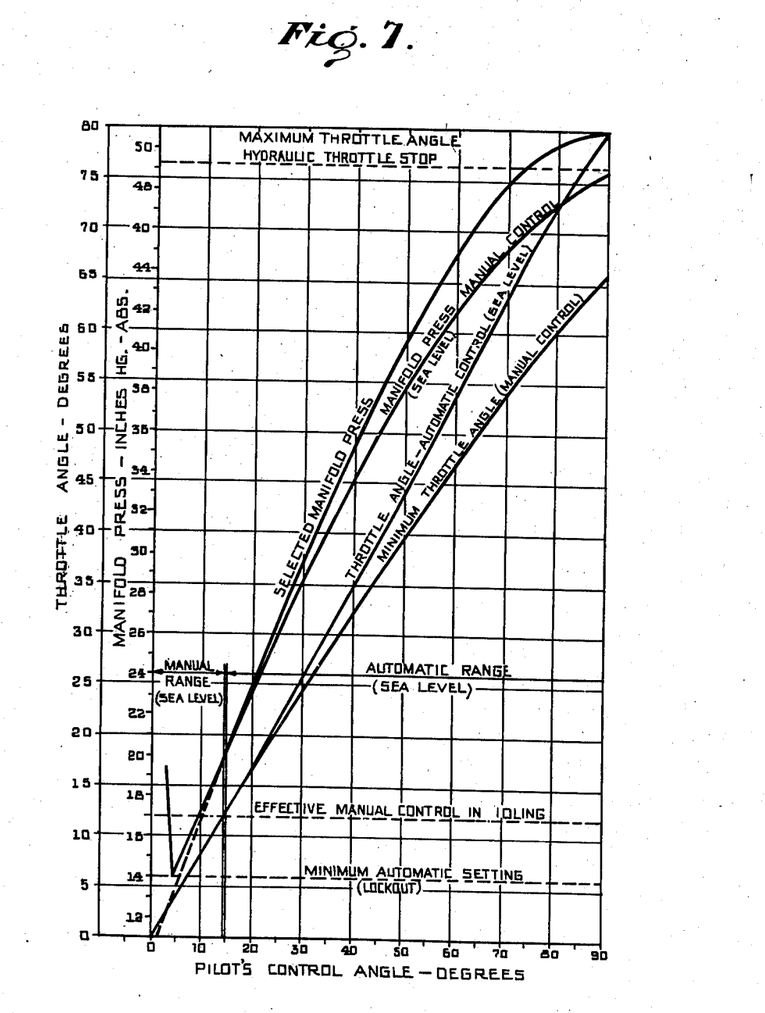
Figure 7 is a view illustrating graphically the operative characteristics of my automatic throttle control as compared to the operative characteristics of a manual throttle control applied to a given internal combustion engine at assumed sea level atmospheric pressure conditions.

The foregoing features of operation of my invention are illustrated graphically in Figure 7 and no further explanation is believed necessary.

A modified form of my invention is shown in Figure 8 wherein I have provided a throttle control lever 100 whereby the throttle 19 may at all times be kept under manual control, while retaining the automatic features previously noted.

This is specifically accomplished by providing a walking-beam 101 which is pivotally connected at a point 102 intermediate the opposite ends thereof to the free end of the arm 17 previously described.

An end 103 of the walking-beam 101 is pivotally connected to the throttle control rod 18. The other end 104 is pivotally connected to one end of a throttle control rod 105. The opposite end of the throttle control rod 105 is pivotally connected to an end of the throttle control lever 100 which is pivoted at 106 in a throttle control lever quadrant 107, conveniently mounted within the cabin of the plane for operation by the pilot.

The throttle control lever 100 is so arranged that direct control of the throttle 19 may be accomplished irrespective of the automatic control or the pressure standard determined by the lever 1. This is specifically accomplished by providing the quadrant 107 with sufficient arcuate range and limiting the range of movement of the servo piston 52 as shown so that any retarding effect which might otherwise be produced by the manifold pressure setting of the cam 26 through the control lever 1 as previously explained, may be readily overcome by the adjustment of the lever 100 in an amount in excess of the range of the retarding adjustment of the servo piston 52.

Further, by suitable adjustment of the lever 100 the upper and lower ranges of automatic adjustment of the throttle 19 may be conveniently varied so that automatic operation may be effected only when the manifold pressure drops below a predetermined minimum value or rises above a predetermined maximum value, depending upon the adjustment of the throttle control 100. Thus the limit of the opening of the throttle 19 by automatic means may be readily decreased and the limit of the closing of the throttle 19 increased by adjustment of the lever 100 in a clockwise direction on the quadrant 107. Likewise the limit of the opening of the throttle 19 by automatic means may be increased and the limit of the closing decreased by movement of the lever 100 in a counter-clockwise direction on the quadrant 107. Thus the safety ranges of automatic operation may be varied at the discretion of the pilot.

From the foregoing it will be readily seen that not only may the standard of operation of the automatic control be regulated by the pilot through the control lever 1 previously described, but also the operation of the throttle 19 is at all times subject to manual control by the pilot through the throttle control lever 100. Thus there is provided convenient means whereby the throttle 19 may be readily adjusted for variables affecting the operation of the engine and not reflected merely in the manifold pressure, such as for example variance in the moisture content of the air, variance in temperature, variance in the quality of the fuel, creeping throttle conditions and other conditions out of the control of the pilot such as a breakdown of the automatic means.

Moreover, in the provision of the abutment rod 64 of Figures 1 and 8, there is provided means for locking the pressure responsive mechanism 38 out of operation upon appropriate adjustment of the control lever 1 to within a predetermined low pressure setting range and adjustment of the throttle valve 19 to a nearly closed position at which a characteristic inversion of the pressure in the intake conduit of the engine occurs, as shown graphically in Figure 7.

In the latter low pressure inversion range the mechanism 38 is locked out of operation by the lock-out rod 64, whereupon the throttle 19 may be manually actuated by lever 1 through the linkage 3, arm 5, shaft 6, arm 11, lever 12, links 13 and 14, shaft 16, arm 17 and link 18.

Although only two embodiments of the invention have been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A throttle control, comprising, in combination, engine manifold pressure responsive means for automatically adjusting said throttle, manual control means for adjusting said manifold pressure responsive means, stop means for limiting the adjustment of said throttle by said automatic means at a predetermined position of said throttle, connecting means arranged for the adjustment of said throttle by said manual control means without interference from said stop means, means arranged for actuating said stop means into said limiting position upon a predetermined adjustment of said throttle, and separate means for adjusting said stop means so as to vary the predetermined adjustment of said throttle at which said stop means may be actuated into said limiting position.

2. A throttle control, comprising, in combination, a walking beam, a condition responsive means operably connected at one end of said walking-beam to said throttle, a control member connected to said walking-beam at a point intermediate said opposite ends, and means controlled by the opposite end of said walking-beam for limiting in one direction the adjustment of said one end by said condition responsive means upon a predetermined adjustment of said throttle, whereupon said throttle may be adjusted by said control member unimpeded by said limiting means.

3. A throttle control, comprising, in combination, a walking-beam, floating lever, a manifold pressure responsive means pivotally connected to said floating lever at a first point thereon, means connecting said floating lever at a second point thereon to a first point on said walking beam, means for connecting said throttle to a second point on said walking beam whereby said throttle may be adjusted by said pressure responsive means in accordance with predetermined manifold pressure values, manual control means connected to said walking beam at a third point, and means pivotally connecting said floating lever at a third point to said manual control means whereby the aforesaid predetermined manifold pressure values may be selected by adjustment of said manual control means.

4. A throttle control, comprising, in combination, a walking-beam, a floating lever, a manifold pressure responsive means pivotally connected to said floating lever at a first point thereon, means connecting said floating lever at a second point thereon to a first point on said walking-beam, means for connecting said throttle to a second point on said walking-beam whereby said throttle may be adjusted by said pressure responsive means in accordance with predetermined manifold pressure values, manual control means connected to said walking-beam at a third point, means controlled by said walking-beam for limiting the adjustment of said walking-beam by said pressure responsive means upon a predetermined adjustment of said control means, and means pivotally connecting said floating lever at a third point to said manual control means whereby the aforesaid predetermined manifold pressure values may be selected by adjustment of said manual control means.

5. A throttle control, comprising, in combination, a walking-beam, a floating lever, a manifold pressure responsive means pivotally connected to said floating lever at a first point thereon, means connecting said floating lever at a second point thereon to a first point on said walking-beam, means for connecting said throttle to a second point on said walkin-beam whereby said throttle may be adjusted by said pressure responsive means in accordance with predetermined manifold pressure values, manual control means connected to said walking-beam at a third point, means controlled by said walking-beam for limiting the adjustment of said walking-beam by said pressure responsive means upon a predetermined adjustment of said control means, a lever arm pivotally mounted intermediate the opposite ends thereof, one end of said lever arm pivotally connected at a third point on said floating lever, and means releasably connecting the opposite end of said lever arm to said manual control means whereby the aforesaid predetermined manifold pressure values may be selected by adjustment of said manual control means, said releasable connecting means being adapted to disconnect said lever arm and said manual control means upon movement of said pressure responsive means in a direction opposed by said limiting means.

6. A throttle control, comprising, in combination, condition responsive means for automatically adjusting said throttle, a manual control member, releasable means for connecting said control member and said condition responsive means for the adjustment of said condition responsive means by said control member, means for limiting the adjustment of said throttle by said condition responsive means upon a predetermined adjustment of said manual control means, and said releasable means arranged to disconnect said control member and said condition responsive means upon movement of said pressure responsive means in a direction opposed by said limiting means.

7. A device of the character described, comprising, in combination, condition responsive means for automatically adjusting a control device, a control member, releasable means for connecting said control member and said condition responsive means for the adjustment of said condition responsive means by said control member, and means for limiting the adjustment of said control device by said condition responsive means upon a predetermined adjustment of said control device, said releasable means being arranged to disconnect said control member and said condition responsive means upon action of said condition responsive means in a sense opposed by said limiting means.

8. A throttle control, comprising, in combination, condition responsive means for automatically adjusting said throttle, a first manual control member for adjusting said automatic means, limiting means determining the extent of adjustment of said throttle by said automatic means, a second manual control member for directly adjusting said throttle in such a manner as to vary the extent of adjustment of said throttle by said condition responsive means, and means connecting said first manual control member to said throttle for effecting manual control of said throttle independently of said second control member.

9. A throttle control, comprising, in combination an intake manifold pressure responsive means, a shaft driven by said pressure responsive means, said shaft operably connected to said throttle for adjusting the same, first stop means limiting the maximum opening of said throttle by said pressure responsive means, second stop means limiting the minimum opening of said throttle by said pressure responsive means, first manually operable means connected to said shaft for opening and closing said throttle free of said limiting means, whereby said throttle may be fully opened and closed under control of said first manually operable means, and second manually operable means connected to said shaft for varying said minimum and maximum limits for opening said throttle by said pressure responsive means.

10. In a hydraulic control valve of the class including a cylinder having control ports formed therein, a valve slidably mounted in said cylinder for controlling said ports, a control rod projecting from one end of said cylinder for slidably positioning said valve in said cylinder; the improvement comprising a member slidably mounted at the opposite end of said cylinder and arranged to releasably engage the valve so as to limit movement of said valve in one direction, a condition responsive means operably connected to said control rod, means for changing the datum of said condition responsive means, and means operably connecting said datum changing means to said member so as to limit movement of the valve in said one direction at a predetermined datum setting of said condition responsive means.

11. In a device of the class including a hydraulic motor means for adjustably positioning a control device, a valve cylinder having ports formed therein, a valve slidably mounted in said cylinder for controlling said ports so as to regulate the direction of flow of a fluid medium to said hydraulic motor means, a condition responsive means for actuating said valve in a first and in a second sense for determining the direction of movement of said motor means; the improvement comprising a pin slidably mounted in one end of said cylinder, actuating means for said pin, said actuating means operably connected to said motor means, whereby said motor means may actuate said pin into engaging relation with one end of said valve for limiting the adjustment of said valve in one direction upon a predetermined adjustment of said control device, means for changing the datum of said condition responsive means, means connecting said datum changing means to the actuating means for said pin, and manual means for jointly operating said actuating means and said datum changing means through said last mentioned connecting means.

12. A throttle control, comprising, in combination, an intake manifold pressure responsive means, a shaft driven by said pressure responsive means, said shaft operably connected to said throttle for adjusting the position of the same so as to automatically maintain a predetermined intake manifold pressure, a first stop member limiting the adjustment of the position of said throttle by said pressure responsive means in a throttle opening direction, manually operable means for adjusting the pressure setting of said pressure responsive means, a second stop member limiting the minimum pressure automatically maintainable by the pressure responsive means to a predetermined critical value, said manually operable means arranged so as to adjust the setting of said pressure responsive means to values greater and values less than said critical value, and means connecting said manually operable means to said shaft so that said manually operable means may fully open and close said throttle independently of said pressure responsive means.

13. A throttle control, comprising, in combination, an intake manifold pressure responsive means, a shaft driven by said pressure responsive means, said shaft operably connected to said throttle for adjusting the position of the same so as to automatically maintain a predetermined intake manifold pressure, a first stop member limiting the adjustment of the position of said throttle by said pressure responsive means in a throttle opening direction, manually operable means for adjusting the pressure setting of said pressure responsive means, a second stop member limiting the minimum pressure automatically maintainable by the pressure responsive means to a predetermined critical value, said manually operable means arranged so as to adjust the setting of said pressure responsive means to values greater and values less than said critical value, means connecting said manually operable means to said shaft so that said manually operable means may fully open said throttle without interference from said first stop member and close said throttle independently of said pressure responsive means upon the setting of said pressure responsive means being at a value less than said critical value, and said second stop member being adjustable so as to vary said critical value.

14. A device of the character described, comprising, in combination, a condition responsive means for operating a control device so as to automatically maintain a predetermined condition, means for adjusting the datum of said condition responsive means, manual means for adjusting said datum changing means, means for limiting the condition automatically maintainable by said condition responsive means to values within a predetermined critical range, said manual means being arranged so as to adjust the datum of said condiiton responsive means to condition values other than the values within said critical range, mechanical linkage means directly connecting said manual means to said control device so that upon the adjustment of the datum of said condition responsive means to a value other than the values within said critical range said control device may be manually adjusted independently of said condition responsive means.

15. A throttle control, comprising, in combination, condition responsive means for automatically adjusting said throttle so as to maintain a preselected condition, manual control means for adjusting said automatic means so as to vary said selected condition, first means for limiting the adjustment of said throttle by said automatic means, said limiting means including a first member operably connected to said throttle and adjustably positioned in response to movement of said throttle, and a second member actuated by said first member at a predetermined position of said throttle to render said automatic means inoperative for adjusting said throttle; a second means for limiting movement of said condition responsive means under a selected condition, and said manual control means being so arranged as to effect adjustment of said throttle without interference from said first and second limiting means.

16. A throttle control, comprising, in combination, condition responsive means for automatically adjusting said throttle so as to maintain a preselected condition, manual control means for adjusting said automatic means so as to vary said selected condition, first means for limiting the adjustment of said throttle by said automatic means, said limiting means including a first member operatively connected to said throttle and adjustably positioned in response to movement of said throttle, a second member actuated by said first member at a predetermined position of said throttle to render said automatic means inoperative for adjusting said throttle, a second means limiting movement of said condition responsive means under a selected condition, said manual control means so arranged as to effect adjustment of said throttle without interference from said first and second limiting means, and said second means including an adjustable member for varying the conditions under which the movement of said condition responsive means may be limited.

17. A control mechanism comprising, in combination, a servo-motor system, means for controlling said system, condition responsive means, means for operative connecting said condition responsive means to said control means, means locking said condition responsive means from operative relation with said connecting means, and resilient means for permitting free operation of said condition responsive means during said locking operation.

18. In a device of the class including a hydraulic motor means for adjustably positioning a control device, a valve cylinder having ports formed therein and respectively connected to said motor means, a valve slidably mounted in said cylinder for controlling said ports so as to regulate the direction of flow of a fluid medium to said hydraulic motor means, a condition responsive means for actuating said valve in a first and in a second sense for determining the direction of movement of said motor means; the improvement comprising a pin slidably mounted in one end of said cylinder, actuating means for said pin, said actuating means being operatively connected to said motor means, whereby said motor means may actuate said pin into engaging relation with an adjacent one end of said valve for limiting the adjustment of said valve in one direction upon a predetermined adjustment of said control device.

19. In a device of the class including a hydraulic motor means for adjustably positioning a control device, a valve cylinder having ports formed therein and respectively connected to said motor means, a valve slidably mounted in said cylinder for controlling said ports so as to regulate the direction of flow of a fluid medium to said hydraulic motor means, a condition responsive means for actuating said valve in a first and in a second sense for determining the direction of movement of said motor means; the improvement comprising a pin slidably mounted in one end of said cylinder, actuating means for said pin, said actuating means being operatively connected to said motor means, whereby said motor means may actuate said pin into engaging relation with an adjacent one end of said valve for limiting the adjustment of said valve in one direction upon a predetermined adjustment of said control device, a first spring for biasing said pin out of engaging relation with the one end of the valve, and a second spring connected at the opposite end of said valve to bias the valve out of engaging relation with said pin.

20. A throttle control, comprising, in combination, condition responsive means for automatically adjusting said throttle, a first manual control member for adjusting said automatic means and mechanically connectable to said throttle, limiting means determining the extent of adjustment of said throttle by said automatic means and permitting direct manual adjustment of said throttle by said first manual control member within a predetermined limited range, and a second manual control member for directly adjusting said throttle in such a manner as to vary the extent of adjustment of said throttle by said automatic means.

21. A throttle control, comprising, in combination, a walking beam, a condition responsive means for operating said throttle and operatively connected to one end of said walking beam, a control member pivotally connected to said walking beam at a point intermediate its ends, means connecting the throttle with a point of the walking beam other than said intermediate point, and means controlled by the opposite end of said walking beam for limiting in one direction the adjustment of said one end by said condition responsive means upon a predetermined adjustment of said throttle, whereupon said throttle may be adjusted by said control member unimpeded by said limiting means.

22. A throttle control, comprising, in combination, a walking beam, an engine manifold pressure responsive means including a fluid pressure responsive bellows, a control valve operated by said bellows, and a fluid motor means regulated by said valve for operating said throttle, said fluid motor means being operatively connected to one end of said walking beam; a manually operable arm pivotally connected to said walking beam at a point intermediate its ends, means connecting the throttle with a point of the walking beam other than said intermediate point, and a knocker arm controlled by the opposite end of said walking beam for limiting movement of said control valve by said bellows upon a predetermined adjustment of said throttle, whereupon said throttle may be manually adjusted through said arm unimpeded by said limiting means.

23. A throttle control, comprising, in combination, a walking-beam, a floating lever, a manifold pressure responsive means pivotally connected to said floating lever at a first point thereon, means connecting said floating lever at a second point thereon to a first point on said walking-beam, means for connecting said throttle to a second point on said walking-beam whereby said throttle may be adjusted by said pressure responsive means in accordance with predetermined manifold pressure values, manual control means connected to said walking-beam at a third point, means controlled by said walking-beam for limiting the adjustment of said walking-beam by said pressure responsive means upon a predetermined adjustment of said walking-beam, and means pivotally connecting said floating lever at a third point to said manual control means whereby the aforesaid predetermined manifold pressure values may be selected by adjustment of said manual control means.

24. A throttle control, comprising, in combination, condition responsive means for automatically adjusting said throttle, a first manual control member for adjusting the setting of said automatic means, limiting means determining the extent of adjustment of said throttle by said automatic means, a second manual control member connected to the throttle to directly adjust the throttle in addition to the adjustment of the throttle by the condition responsive means, and means connecting said first manual control member to said throttle for effecting manual control of said throttle independently of said second control member.

25. A throttle control, comprising, in combination, an intake manifold pressure responsive means, a shaft driven by said pressure responsive means, said shaft operatively connected to said throttle for adjusting the position of the throttle so as to automatically maintain a predetermined intake manifold pressure, a first stop member limiting the adjustment of the position of said throttle by said pressure responsive means in a throttle opening direction, manually operable means for adjusting the pressure setting of said pressure responsive means, a second stop member for the pressure responsive means and limiting the minimum pressure automatically maintainable by the pressure responsive means to a predetermined critical value, said manually operable means being arranged so as to adjust the setting of said pressure responsive means to values greater and values less than said critical value, and means connecting said manually operable means to said shaft so that said manually operable means may fully open and close said throttle independently of said pressure responsive means.

26. The combination defined by claim 1 in which said separate means comprises an eccentric pin and an arm pivotally mounted thereon, said eccentric pin having a slotted end accessible from the exterior of the control for adjustment.

27. In combination, a motor means, a control element for said motor means, a regulator connected to one end of said control element, a lever operatively connected at a first point to said motor means, a knocker arm operatively connected to said lever at a second point, a second element to releasably engage said control element at the other end thereof, a second arm pivotally mounted and positioned between said knocker arm and second element, said second arm being arranged for actuation by said knocker arm into engaging relation with said second element to place said motor means in an inoperative relation.

28. The combination defined by claim 27 including an eccentric pin for pivotally mounting said second arm, and said eccentric pin adjustable to vary the relation between said second arm and second element.

29. The combination defined by claim 27 including a manually movable member for pivotally supporting said lever at a point intermediate said first and second points for effecting independent manual adjustment of said lever.

30. A throttle control for an aircraft engine having an intake manifold in which there is a characteristic inversion of pressure upon closure of the throttle past a predetermined point, comprising, in combination, engine intake manifold pressure responsive means for positioning the throttle during normal operation, means for automatically locking the manifold pressure responsive means out of operation within the predetermined pressure inversion range, and manual means for manually actuating the throttle within said pressure inversion range.

31. A throttle control for an aircraft engine, comprising, in combination, engine intake manifold pressure responsive means for positioning the throttle during normal operation to maintain a predetermined intake manifold pressure, manually operable means for varying the predetermined pressure setting of the pressure responsive means, means for automatically locking the manifold pressure responsive means out of operation within a predetermined low intake manifold pressure inversion range, and manual means for manually actuating the throttle within the stated low pressure inversion range.

32. The combination with an intake conduit of an internal combustion engine and a throttle valve for controlling flow of combustible mixture in said intake conduit, said intake conduit having a characteristic pressure inversion upon adjustment of the throttle valve to maintain a pressure below a predetermined value; of manual means for actuating said throttle valve, automatic means responsive to engine intake pressure for positioning said throttle valve, means responsive to movement of said manual means for adjusting the pressure setting of said automatic means, and means for transferring from automatic to manual control of said throttle valve upon adjustment of the pressure setting of said automatic means to below the stated predetermined value.

33. The combination with an intake conduit of an internal combustion engine and a throttle valve for controlling flow of combustible mixture in said intake conduit, said intake conduit having a characteristic pressure inversion upon adjustment of the throttle valve to maintain a pressure below a predetermined value; of manual means for actuating said throttle valve including a pilot's control lever and a walking-beam interconnecting the control lever to the throttle valve; automatic means responsive to engine intake pressure for positioning said throttle valve including a bellows movable in response to said intake pressure, a servo valve actuated by the bellows to one side or the other of a null position, and a servo-motor means controlled by the servo valve and interconnected to the throttle valve through said walking-beam; means responsive to movement of said manual means for adjusting the pressure setting of said automatic means including a cam operatively connected to said control lever, a cam follower, and linkage operatively interconnecting the cam follower, servo valve, and bellows, said cam follower arranged to vary the null position of the valve with relation to the bellows; and means for transferring from automatic to manual control of said throttle valve upon adjustment of the pressure setting of said automatic means to below the stated predetermined value, including an abutment rod so arranged as to limit in one sense movement of said bellows to prevent adjustment of the servo valve to a null position by said bellows and thereby locking out of operation said automatic means and transferring the control of said throttle valve to said manual means.

34. The combination with an intake conduit of an internal combustion engine and a throttle valve for controlling flow of combustible mixture in said intake conduit, a pilot's control lever, a walking-beam mechanically interconnecting the control lever to the throttle valve, a bellows movable in response to changes in the pressure in the intake conduit, a servo valve actuated by the bellows to one side or the other of a null position, a servo-motor controlled by the servo valve and interconnected by said walking-beam to said throttle valve so as to adjust the throttle valve to maintain a predetermined intake pressure, a cam operatively connected to said control lever, a cam follower, linkage operatively interconnecting the cam follower, servo valve and bellows, said cam follower adjustably positioned by the cam to vary the null position of the servo valve with relation to the bellows and thereby the pressure setting of the bellows, an abutment rod so arranged as to prevent movement of the bellows in a sense to adjust the servo valve to a null position upon adjustment of the cam so as to decrease the pressure setting of the bellows to below a predetermined critical value and thereby locking out of operation the servo-motor and transferring the control of said throttle valve to said manual means within the stated critical low pressure range, a lock out pin movably mounted relative to said servo valve for locking the servo valve and thereby the servo-motor out of operation, a knocker arm interconnected with said throttle valve for actuating said lock out pin to a position for locking the servo valve and thereby the servo-motor out of operation upon adjustment of the throttle valve past a predetermined critical open position so as to thereby transfer the control of said throttle valve to said manual means within the stated critical open range.

35. The combination defined by claim 34 including said abutment rod adjustably mounted to vary the critical low pressure range, and said knocker arm adjustably arranged to vary the critical open throttle valve range.

36. The combination comprising a pair of axially arranged bellows, an abutment rod provided in one of said bellows for limiting the movement thereof in one sense, another abutment rod in the other bellows for limiting the movement thereof in a second sense, at least one of said abutment rods being adjustably arranged so as to vary the extent of permissible movement of said bellows.

37. In a device of the class including a fluid pressure operated motor means for adjustably positioning a control device, a valve cylinder having a control port formed therein and operatively connected to said motor means, a valve slidably mounted in said cylinder for controlling said port so as to control the direction of movement of said motor means, condition responsive means for actuating said valve in a first and in a second sense for determining the direction of movement of said motor means, and means for changing the datum of said condition responsive means; the improvement comprising a member slidably mounted at one end of the valve, actuating means for said member, said actuating means being operatively connected to said datum changing means, whereby said member may be actuated into engaging relation with said valve for limiting the adjustment of said valve in one direction upon a predetermined adjustment of said datum changing means.

38. In a device of the class including a fluid pressure operated motor means for adjustably positioning a control device, a valve cylinder having a control port formed therein and operatively connected to said motor means, a valve slidably mounted in said cylinder for controlling said port so as to control the direction of movement of said motor means, condition responsive means for actuating said valve in a first and in a second sense for determining the direction of movement of said motor means; the improvement comprising a member slidably mounted at one end of the valve, actuating means for said member, said actuating means being operatively connected to said control device, whereby said member may be actuated into engaging relation with said valve for limiting the adjustment of said valve in one direction upon a predetermined adjustment of said control device.

HOWARD A. ALEXANDERSON.

REFERENCES CITED

The following references are of record in the file of this patent:

UNITED STATES PATENTS

| Number | Name | Date |
| --- | --- | --- |
| 2,151,832 | Bugatti | Mar. 28, 1939 |
| 2,205,354 | Gregg et al. | June 18, 1940 |
| 2,217,364 | Halford et al. | Oct. 8, 1940 |